Figure 1:
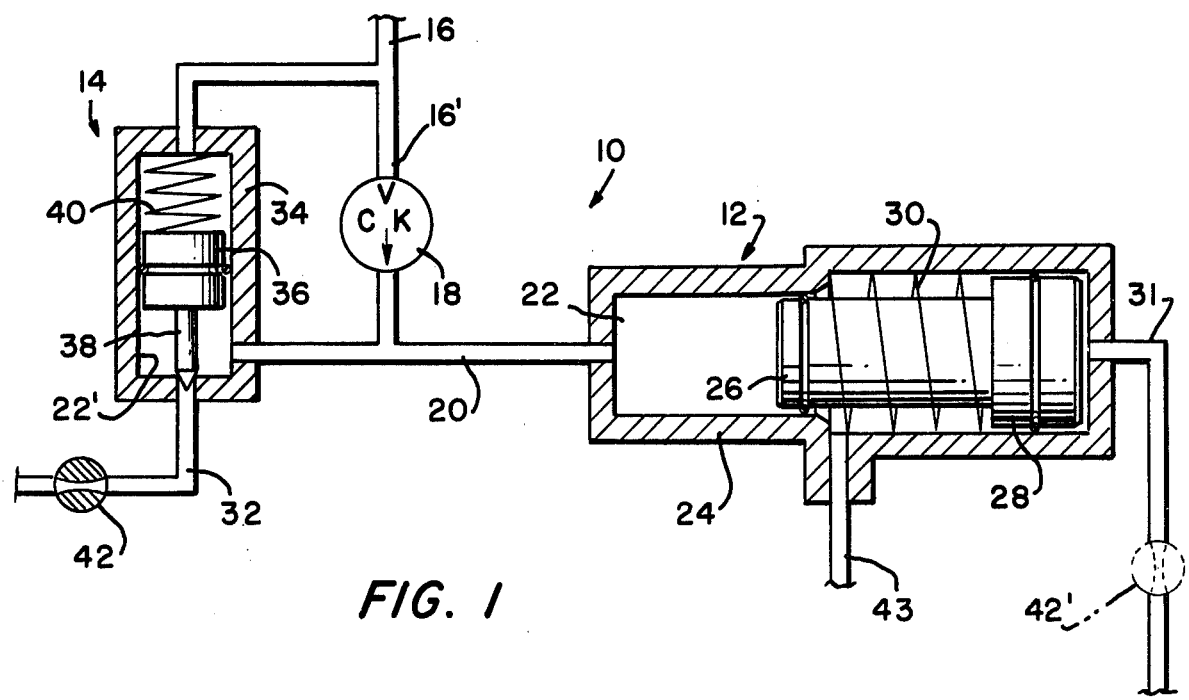

United States Patent [19]

Kramer

[11] 4,157,132
[45] Jun. 5, 1979

[54] LUBRICATOR

[75] Inventor: Leo Kramer, Lambertville, N.J.

[73] Assignee: Ingersoll-Rand Company, Woodcliff Lake, N.J.

[21] Appl. No.: 861,124

[22] Filed: Dec. 16, 1977

[51] Int. Cl.² ............................................. F16N 25/02
[52] U.S. Cl. .................................. 184/7 D; 184/55 R
[58] Field of Search ............ 184/7 D, 7 E, 7 R, 55 R

[56] References Cited

U.S. PATENT DOCUMENTS

| | | | |
|---|---|---|---|
| 3,068,959 | 12/1962 | McKenzie | 184/7 D |
| 3,129,788 | 4/1964 | Heckt | 184/55 R |
| 3,353,712 | 11/1967 | Prescott | 184/7 D X |
| 3,581,845 | 6/1971 | Van Nederjnen | 184/7 D |
| 3,693,757 | 9/1972 | Callahan et al. | 184/7 D |
| 3,820,441 | 6/1974 | Ward | 184/7 D |

*Primary Examiner*—David H. Brown
*Attorney, Agent, or Firm*—Bernard J. Murphy

[57] ABSTRACT

The lubricator, according to the embodiment shown, comprises a lubricant storage chamber, which is connected between a lubricant supply line and lubricant discharge line, in which to receive a stored "charge" of lubricant. The chamber is evacuated by a plunger carried by a piston, the latter being operated by pneumatic pressure when the device to be lubricated is started up or turned "on". By way of example, the lubricator will supply a charge of lubricant to an air motor on motor start up; the plunger-operating piston is translated by a portion of the compressed air which is conducted to the air motor. A further piston-carried closure element is interposed in the lubricant discharge line to insure that, where the lubricant supply is under pressure, lubricant will not be conducted into the lubricant discharge line until the machine to be lubricated is started.

15 Claims, 2 Drawing Figures

LUBRICATOR

This invention pertains to lubricators, and in particular to lubricators of the type which are so constructed as to supply a single, one-time surge or "charge" of lubricant into a device, such as an air motor, on each start up of the device.

Lubricators of this type are well known in the prior art, and typical thereof is the "Air Starter and Lubricator Throttle Valve Therefor", U.S. Pat. No. 3,816,040, issued June 11, 1974, to Lee P. Janik. In the patentee's lubricator, and in others of this type, the manner of supplying lubricant to the using device is adequate where the lubricant is supplied by gravity or under very minimal pressurization. However, if the lubricant supply line is under any appreciable pressure, the lubricant will be introduced into the air supply line, inadvertently, fully up to the air shut-off valve. Then, with start up of the using device, a full slug of excess lubricant is dumped into the using device in advance of the intended and properly-stored lubricant charge.

It is an object of this invention, then, to provide a lubricator which is equally useful where the lubricant is supplied under pressure or by gravity.

It is also an object of this invention to set forth a lubricator comprising first means, for communication with a source of lubricant, for conducting lubricant therealong, in a given direction, for lubricating an apparatus; second means, movably interposed in said first, conducting means, for preventing lubricant flow counter-current to said given direction; wherein said second means includes third means, movable between a first positioning thereof, for closing off said conducting means to lubricant flow, and a second positioning thereof for opening said conducting means to lubricant flow; said third means comprises a bearing surface reactively responsive to a pressured-fluid force to move said third means from one of said first and second positionings to the other of said positionings; and means coupled to said third means operative for supplying pressured lubricant to said bearing surface.

Figure 2:
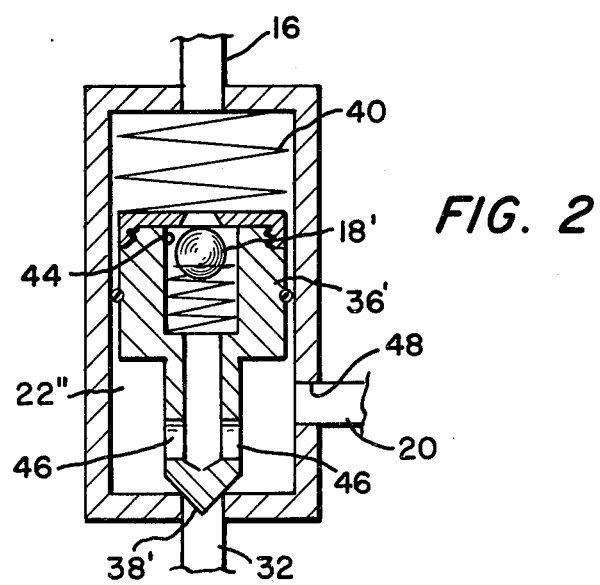

Further objects of this invention as well as the novel features thereof will become more apparent by reference to the following description taken in conjunction with the accompanying Figures in which:

FIG. 1 is a combination schematic and cross-sectional, pictorial diagram of a preferred embodiment of the invention; and FIG. 2 is a cross-sectional view of an alternative embodiment of the piston-carried closure element and check valve, the two being incorporated into one composite assembly.

As shown in the Figures, the lubricator 10, according to an embodiment thereof, comprises a lubricant storage assembly 12 and a discharge line closure assembly 14. A lubricant supply line 16 communicates through a first control line 16' and a check valve 18 with a lubricant conduit 20. In turn, conduit 20 opens onto a lubricant storage chamber 22 defined by a cylinder 24. A plunger 26 is slidably disposed in the cylinder 24 and has a piston 28 at one end thereof which is urged by a spring 30 in a direction (away from chamber 22) providing an enlarged or maximum-volume storage area in chamber 22. The end of the cylinder 24 which is opposite conduit 20 and chamber 22 has an air line 31 in communication therewith. Line 31 is provided for admitting pressurized air into cylinder 24 to operate on the piston 28, to move the plunger 26 so as to expel lubricant from chamber 22 through conduit 20.

Conduit 20 communicates with a lubricant discharge line 32 by way of the discharge line closure element assembly 14. The closure element assembly 14 comprises another cylinder 34 in which there is another piston 36 slidably arranged which carries an elongate closure element 38 for blocking lubricant passage into the lubricant discharge line 32. Another spring 40 biases the piston-carried closure element 38 normally to close the discharge line 32. However, when compressed air or gas is introduced via line 31, to move the piston-plunger 26 in the storage chamber 22, the resultingly pressured lubricant which is expelled from the chamber 22 passes into subchamber 22' of assembly 14. The pressured lubricant overcomes the bias of the spring 40 and moves the piston 36 upwardly to open the lubricant discharge line 32.

It is immaterial whether the lubricant in the supply line 16 is gravity fed or under high pressure because of the disparity in the surface areas of the opposite ends of the piston 36 (which carries the closure element 38). The greater surface area of the uppermost portion of piston 36, together with the spring biasing of the closure element 38, will maintain the discharge line 32 closed to lubricant conduct unless and until pneumatic pressure translates the storage chamber piston 28.

The check valve 18 is provided simply to prevent a counter-current flow of lubricant when the plunger 26 is translated. Also, the restrictor 42 is provided in the discharge line 32 (or alternatively a restrictor 42' is provided in the gas supply line 31) to control the rate of flow of lubricant to the downstream using device (not shown). Line 43 is simply a lubricant bleed conduit which communicates with a lubricant reservoir (not shown).

In FIG. 2 is an alternative embodiment in which a piston-borne closure element 38' is combined with a check valve 18' to obviate any requirement for parallel lines between the lubricant supply line 16 and the lubricant discharge line 32. In this, the closure element-carrying piston 36' and the closure element 38' itself are both axially bored to accommodate therethrough the supply of lubricant to the storage chamber 22. The axial bore 44 opens, via ports 46, onto opposite sides of the closure element 38'. Accordingly, lubricant passed therethrough, into the subchamber 22", is conducted out of a side port 48 into conduit 20 (FIG. 1).

While I have described my invention in connection with specific embodiments thereof, it is to be clearly understood that this is done only by way of example, and not as a limitation to the scope of my invention as set forth in the objects thereof and in the appended claims.

I claim:

1. A lubricator, comprising:
   first means, for communication with a source of lubricant, for conducting lubricant therealong, in a given direction, for lubricating an apparatus;
   second means, movably interposed in said first, conducting means, for preventing lubricant flow counter-current to said given direction; wherein
   said second means includes third means, movable between a first positioning thereof, for closing off said conducting means to lubricant flow, and a second positioning thereof for opening said conducting means to lubricant flow;

said third means comprises a bearing surface reactively responsive to a pressured-fluid force to move said third means from one of said first and second positionings to the other of said postionings; and means coupled to said third means operative for supplying pressured lubricant to said bearing surface.

2. A lubricator, according to claim 1, wherein:

said pressured-lubricant supplying means comprises a lubricant storage means, and means for expelling lubricant from said storage means.

3. A lubricator, according to claim 2, wherein:

said storage means comprises a lubricant storage chamber; and said expelling means comprises means for pneumatically pressurizing said chamber.

4. A lubricator, according to claim 2, wherein:

said storage means comprises a cylindrical storage chamber;

said expelling means comprises a piston slidably disposed within said chamber and subdividing said chamber into a lubricant storage area and a pneumatic area; and said expelling means further comprises an orifice opening into said chamber and onto said pneumatic area for admitting pressurized gas thereinto.

5. A lubricator, according to claim 4, wherein:

said storage means further comprises means normally urging said piston in a given direction within said chamber to diminish the volume of said pneumatic area and to enlarge the volume of said lubricant storage area, whereby an appreciable quantity of lubricant may be accommodated in said latter area.

6. A lubricator, according to claim 4, further including:

a conduit opening at one end thereof into said chamber and onto said lubricant storage area, and opening at the other end thereof onto said bearing surface.

7. A lubricator, according to claim 6, wherein:

said conducting means comprises a lubricant discharge line; and said other end of said conduit is coupled to said discharge line for lubricant fluid-flow communication therewith.

8. A lubricator, according to claim 1, wherein:

said third means includes a chamber having an orifice at opposite ends thereof;

a first of said orifices communicates directly with an upstream portion of said conducting means for admitting lubricant into said chamber;

the other of said orifices communicates directly with a downstream portion of said conducting means for expelling lubricant through said other orifice and into said downstream portion; and including a closure element having means for opening and closing at least one of said orifices; and wherein said bearing surface and said closure element are coupled together to cause opening and closing of said one orifice by said closure element pursuant to pressured-lubricant movement of said bearing surface.

9. A lubricator, according to claim 8, wherein:

said one orifice and said other orifice are one and the same, comprising that orifice which both communicates directly with said downstream portion and which is opened and closed by said closure element.

10. A lubricator, according to claim 8, wherein:

said chamber comprises a cylinder; and further including a piston slidably disposed within said cylinder;

said bearing surface is defined by one end of said piston; and said closure element projects outwardly from a given end of said piston toward said one orifice.

11. A lubricator, according to claim 10, further including:

biasing means, interposed between an end of said cylinder and the end of said piston which is opposite said given end, for urging said closure element in closure of said one orifice.

12. A lubricator, according to claim 10, wherein:

said bearing surface comprises a given area; and the end of said piston which is opposite said one end comprises an area greater than said given area.

13. A lubricator, according to claim 10, wherein:

said piston and said closure element have a common throughgoing passageway formed therewithin, said passageway opening at one end externally of said piston in adjacency to said upstream portion, and said passageway opening at the other end externally of said closure element in adjacency to said downstream portion.

14. A lubricator, according to claim 13, wherein:

said counter-current flow preventing means comprises means interposed in said passageway for restricting fluid flow therethrough to one direction only.

15. A lubricator, according to claim 14, wherein:

said restricting means comprises means for restricting flow through said passageway from said first orifice to said second orifice only.

* * * * *